United States Patent [19]
Liebich et al.

[11] Patent Number: 6,105,752
[45] Date of Patent: Aug. 22, 2000

[54] WELD GUN RECEIVER WITH ANTI-REBOUND DEVICE

[75] Inventors: Kurt Liebich, Lich; Hans Wiessler, Wettenberg; Ingeburg Hoehmann, Polheim, all of Germany

[73] Assignee: Emhart Inc., Newark, Del.

[21] Appl. No.: 08/988,624

[22] Filed: Dec. 10, 1997

[30] Foreign Application Priority Data

Dec. 11, 1996 [DE] Germany .................. 296 21 500 U

[51] Int. Cl.⁷ .................................................. B65G 25/04
[52] U.S. Cl. ................................................ 198/747; 221/267
[58] Field of Search ........................... 198/747; 221/267, 221/268

[56] References Cited

U.S. PATENT DOCUMENTS

| | | | |
|---|---|---|---|
| 3,561,641 | 2/1971 | Kerr, Jr. | 221/267 X |
| 3,882,997 | 5/1975 | Dudley | 198/747 X |
| 4,871,895 | 10/1989 | Preston . | |
| 4,984,288 | 1/1991 | Petterson | 221/267 X |
| 5,695,045 | 12/1997 | Mergell et al. | 198/747 |

FOREIGN PATENT DOCUMENTS

| | | |
|---|---|---|
| 0406459 | 1/1991 | European Pat. Off. . |
| 0507472 | 10/1992 | European Pat. Off. . |

*Primary Examiner*—Christopher P. Ellis
*Assistant Examiner*—Gene O. Crawford
*Attorney, Agent, or Firm*—Edward D. Murphy

[57] ABSTRACT

A receptacle for a feed mechanism comprises a receiving body having a receiving chamber connected to a feed duct and a conveying duct extending substantially perpendicularly to the feed duct. At least one blocking means is arranged in the aperture region of the feed duct and reduces a cross section of the feed duct. The blocking means clears the cross section of the feed duct in the direction of the receiving chamber and blocks it in the opposite direction.

15 Claims, 2 Drawing Sheets

WELD GUN RECEIVER WITH ANTI-REBOUND DEVICE

BACKGROUND OF THE INVENTION

The present invention relates to a receptacle for a feed mechanism, in particular for a feed mechanism for a stud welding device, with a receiving body having a receiving chamber connected to a feed duct and a conveying duct extending substantially perpendicularly to the feed duct, and with at least one blocking means which is arranged in the orifice region of the feed duct and reduces a cross section of the feed duct.

The receptacle serves to collect and hold components, in particular studs, and welded-on parts, in particular weld nuts. Such receptacles are provided for feed mechanisms which are used wherever, for example, cylindrical parts have to be supplied to a further processing station in large numbers as is the case, for example, in the car industry. Other known examples of such feed mechanisms are known in rivet clinching tools.

Components are supplied by compressed air by means of which a component is conveyed within a feed tube or a feed conduit to the receptacle. The component is accelerated during the feeding process. It is necessary to stop the component and to hold it in a predetermined position in the receptacle. For stopping a component, it is known to provide a baffle plate which the component strikes in the receptacle. However, this solution causes components having a relatively large weight to rebound, so they do not adopt a predetermined position. To limit a rebound, it is known to provide a blocking means which reduces a cross section of the feed duct at a distance from the baffle plate in the feed duct in a receptacle. The blocking means is a sphere which penetrates partially into the cross section of the feed duct. The sphere is spring loaded. When a component is supplied to the receiving chamber of a receiving body, the component presses the sphere out of the cross section of the feed duct against the spring force so that the component passes into the receiving body. The component is partially decelerated during this process. A spring-loaded sphere is used so that the component is not completely decelerated by the forces occurring between the sphere and the component before entering the receiving chamber. On the other hand, the spring-loaded sphere has to ensure that the forces between the component and the sphere are sufficiently great during any rebound of the component for the spring-loaded sphere to prevent the component escaping from the receiving chamber. For this purpose, it is necessary to adjust the force acting on the sphere within close tolerances. As the forces occurring between the sphere and the component are also dependent on a coefficient of friction, it cannot always be ensured that the components will actually also be held in the receiving chamber by such a blocking means. Owing to its geometry, a sphere does not contribute to a blocking effect, so this effect has to be created merely by the spring force on the sphere.

German Utility Model No. G 94 06 687.6 also discloses a feed mechanism for elongate components, in particular rivets, studs, pins, weld-in parts and the like. The feed mechanism comprises an inlet orifice which can be connected to a feed conduit and an orifice in the top region thereof as well as a clamp with at least two clamp arms. The clamp arms comprise a front clamping region in which the actual clamping process is carried out and a rear pivot pin region which allows pivoting of the clamping arms for opening and closing the clamp.

SUMMARY OF THE INVENTION

It is an object of the present invention to provide a receptacle in which components securely and reliably adopt a predetermined position in the receiving chamber. It is a further object of the present invention to provide the receptacle with a simple structure.

The present invention provides a receptacle for a feed mechanism, which comprises a receiving body having a receiving chamber connected to a feed duct and a conveying duct extending substantially perpendicularly to the feed duct, and with at least one blocking means which is arranged in the aperture region of the feed duct and reduces a cross section of the feed duct, characterized in that the blocking means clears the cross section of the feed duct in the direction of the receiving chamber and blocks it in the opposite direction.

The blocking means ensures that a component passes through the feed duct into the receiving chamber, the component rebounding against the wall of the receiving chamber. The rebound of the component is blocked by the blocking means as it clears the cross section of the feed duct only in the direction of the receiving chamber. High reliability is ensured by this design of a receptacle in that the component remains in the receiving chamber. A receptacle of this type also operates without disturbance as the component is in a predetermined position in the receiving chamber.

To reduce the rebound of the component in the receptacle, it is proposed that the blocking means clears the cross section of the feed duct against a spring force.

The blocking means of the receptacle is preferably designed such that it comprises at least one blocking member which penetrates into the cross section of the feed duct and is inclined toward the receiving chamber. The blocking member can consist of strip-shaped or circular parts. The blocking members are preferably formed from a resilient material. The blocking members are subjected to slight wear.

According to a further advantageous design of the receptacle, it is proposed that the blocking member extend through an orifice formed in the receiving body. The reduction in the cross section of the feed duct can therefore be varied in the aperture region thereof so the receptacle can be adapted to different external contours of components. For holding the blocking member, it is proposed that the blocking member be mounted on the external surface of the receiving body.

According to a further advantageous design of the receptacle, it is proposed that the blocking means have at least a pair of blocking members, the blocking members of a pair being arranged opposingly with respect to the feed duct.

According to a further advantageous design, it is proposed that the blocking members of a pair be connected to one another by a connecting plate. The blocking members and the connecting plate are preferably designed in one piece. An integral design is preferred. The connecting plate preferably surrounds the external surface of the receiving body. It preferably rests on the external surface of the receiving body. A blocking means of this design is produced, for example, from a spring steel. It is strip-shaped, the end regions forming the blocking members which extend through an orifice into the feed duct. The orifices are preferably designed as slots which are open toward one end face of the receiving body so the blocking members can be pushed as one component with the connecting plate onto or into the receiving body.

To achieve maximum effectiveness of the receptacle with respect to a deceleration process and defined fixing of a component in the receiving chamber, it is proposed that, with a receptacle comprising a feed duct with a substantially rectangular cross section, the blocking members have a width substantially corresponding to a width of an adjacent feed duct wall in the blocking member.

According to a further idea of the invention, a feed mechanism of a stud welding device is proposed which comprises a receptacle according to the invention. To enable the feed mechanism to position the component which is to be supplied at the site of further use, the feed mechanism is provided with a loading pin capable of moving to and fro in the longitudinal direction of the conveying duct. The loading pin can be introduced at least partially into the receiving chamber. The receiving body has a through-orifice through which the loading pin can be introduced into the receiving chamber. The conveying duct into which the component is supplied by the loading pin is preferably a tubular stud holder. This tubular stud holder is connected to the receiving body, in particular by a screw connection.

According to a further idea of the invention, a stud welding device with a feed mechanism comprising a receptacle according to the invention.

BRIEF DESCRIPTION OF THE DRAWINGS

Further advantages and details will be described with reference to a preferred embodiment of a receptacle and a preferred embodiment of a feed mechanism, and with reference to the accompanying drawings, in which.

DESCRIPTION OF THE PREFERRED EMBODIMENT

Figure 1:
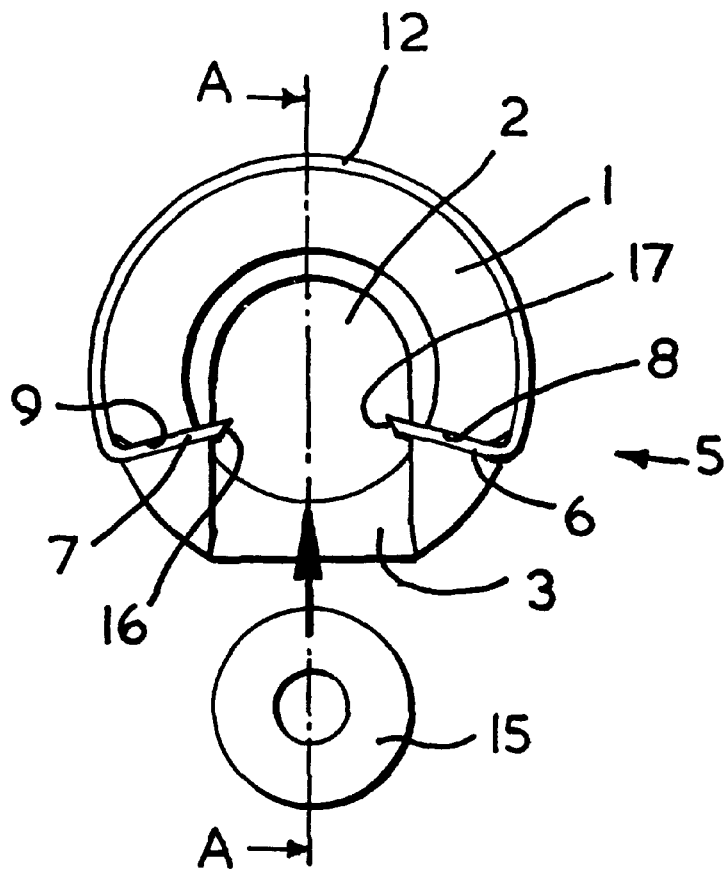
FIG. 1 is a front view of a receptacle.
Figure 2:
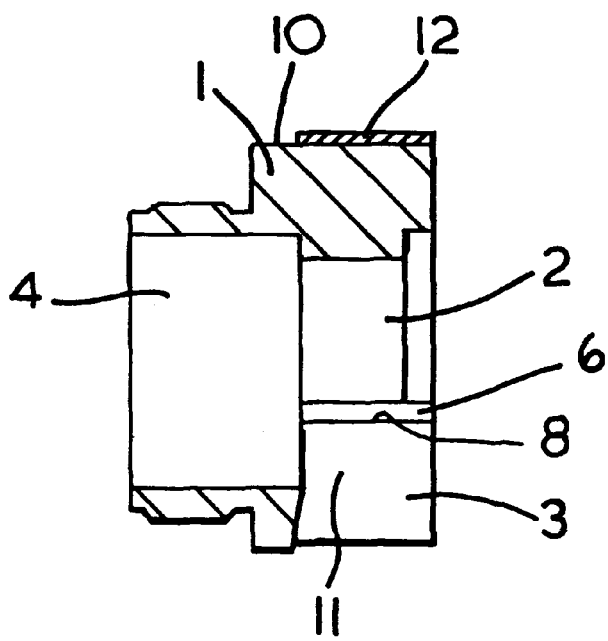
FIG. 2 is a side view from the left in a section along section line A—A of the receptacle.

FIGS. 1 and 2 show an embodiment of a receptacle. The receptacle comprises a receiving body 1. In the receiving body 1, a receiving chamber 2 is formed which is suitable for receiving a component 15. The component 15 is, in this case, a weld nut. A feed duct 3 through which the component 15 passes into the receiving chamber 2 leads into the receiving chamber 2. A feed conduit which can be connected to the receiving body 1 is not shown. The receiving chamber 2 is connected to a conveying duct 4 which extends substantially perpendicularly to the feed duct 3. In the embodiment illustrated, the conveying duct 4 has a circular cross section. The conveying duct 4 is formed coaxially to the receiving chamber 2.

The receptacle comprises a blocking means 5 having two blocking members 6, 7. The blocking members 6, 7 are substantially strip-shaped in design. The blocking member 6 is arranged in a slot-shaped orifice 8. The blocking member 7 is arranged in a slot-shaped orifice 9. The blocking members 6, 7 reduce the cross section of the feed duct 3 in the aperture region of the conveying duct 3. The width of each blocking member 6, 7 substantially corresponds to the width of the adjacent wall 11 of the feed duct 3. The blocking members 6, 7 are arranged opposingly with respect to the feed duct 3. They form a pair of blocking members.

A connecting plate 12 which connects the two blocking members 6, 7 to one another rests on the external surface 10 of the receiving body 1. The blocking members 6, 7 and the connecting plate 12 are formed in one piece from a resilient material.

A component 15 moves in the feed duct 3 toward the receiving chamber 2. The end faces of the blocking members 6, 7 contact the component 15 as it moves into the region of the blocking members 6, 7. The distance between the end regions of the blocking members 6, 7 is smaller than the width of the component 15. The blocking members 6, 7 are pressed radially outwardly owing to the movement of the component 15 and the resilient design of the blocking means 5 so the component 15 passes into the receiving chamber 2. Once the component 15 has passed between the blocking members 6, 7, the blocking members 6, 7 spring back into their starting position. If the component 15 rebounds from the wall of the receiving chamber 2, this component is held in the receiving chamber 2 by the blocking members which have a blocking action. The blocking members 6, 7 are not bent radially outwardly as the blocking members 6, 7 are inclined toward the receiving chamber. The blocking members 6, 7 can have an entry face 16, 17 to simplify the passage of the component 15 between the blocking members 6, 7. It is also possible for the orifice 8, 9 to have a substantially triangular cross section which extends to the receiving chamber 2. In the embodiment illustrated, the blocking means 5 which comprises the blocking members 6, 7 and the connecting plate 12 can be mounted such that it is implemented by pushing the connecting plate 12 onto the receiving body and simultaneously introducing the blocking members 6, 7 into the slot-shaped orifices 8, 9 which are open at one end.

Figure 3:
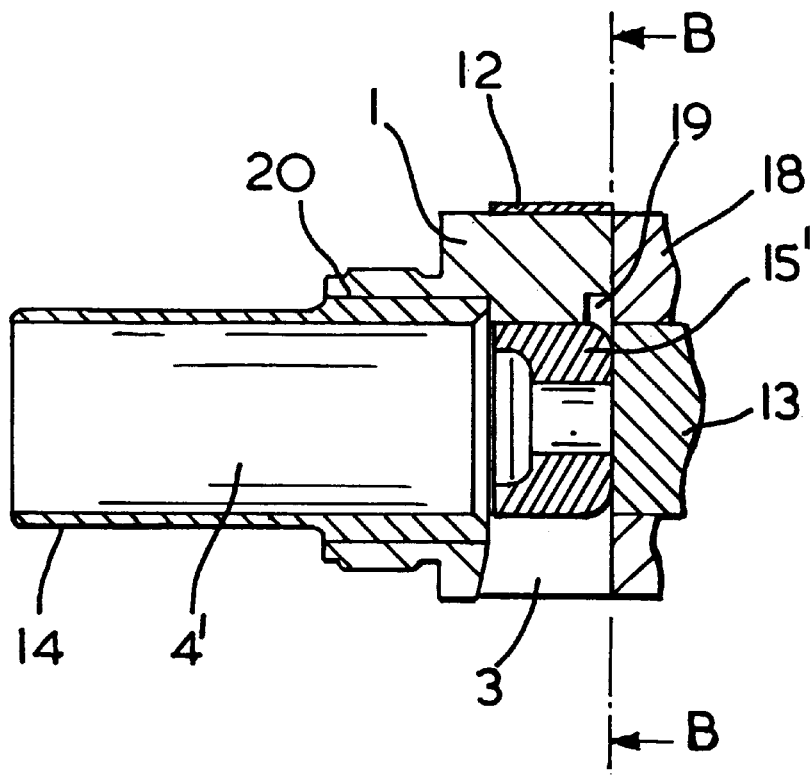
FIG. 3 is a section of a feed mechanism.
Figure 4:
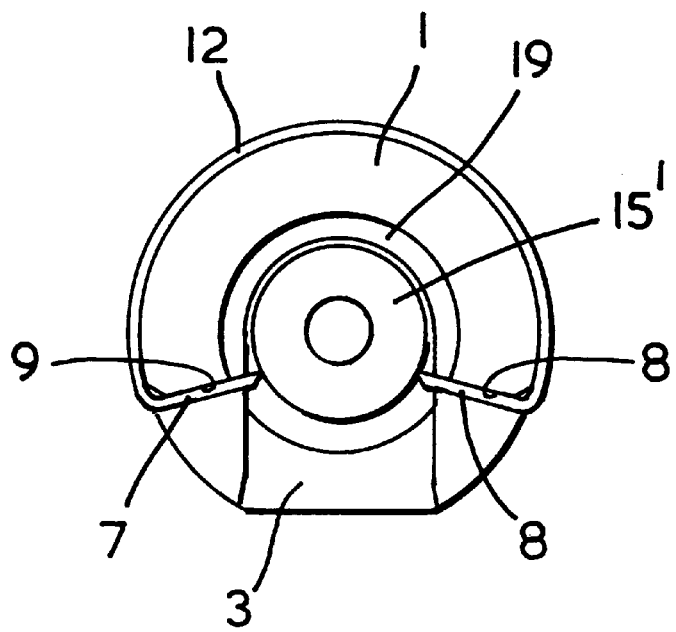
FIG. 4 is a view along line B—B of the feed mechanism according to FIG. 3.

FIGS. 3 and 4 show a feed mechanism, in particular a feed mechanism for a stud welding device. The feed mechanism comprises the receptacle shown in FIGS. 1 and 2. To avoid repetition, reference is made to the descriptions of FIGS. 1 and 2. Identical components of the receptacle are provided with identical reference numerals in FIGS. 3 and 4, while non-identical but corresponding parts are indicated by reference numerals with primes.

The receiving body 1 is connected to a connecting part 18. A loading pin 13 arranged coaxially to the conveying duct 4' is arranged in the connecting part 18. The receiving body 1 comprises a through-orifice 19 through which the loading pin 13 can at least partially be introduced into the receiving chamber so the component 15', which in this case is a weldable stud, can be introduced into the conveying duct 4' by means of the loading pin 13. The conveying duct 4' is formed by a tubular stud holder 14 connected to the receiving body 1 by a screw connection 20. The internal cross section of the conveying duct 4' substantially corresponds to the external contour of the component 15'. The component 15' is positioned in the stud holder by the loading pin 13.

What is claimed is:

1. Receptacle for a feed mechanism, which comprises a receiving body (1) having a receiving chamber (2) connected to a feed duct (3) and a conveying duct (4) extending substantially perpendicularly to the feed duct (3), and with at least one blocking device (5a) which is arranged in the aperture region of the fee duct (3) and reduces a cross section of the feed duct (3), characterized in that the blocking device (5) is movable to clear the cross section of the feed duct (3) to permit passage of a component in the direction of the receiving chamber (2) while blocking component passage in the opposite direction by at least one blocking member (6,7) of the blocking device (5) which is inclined toward the receiving chamber (2) after the component has moved into the receiving chamber (2).

2. Receptacle according to claim 1, characterized in that the blocking device (5) is spring-biased into the cross section of the feed duct (3).

3. Receptacle for a feed mechanism, which comprises a receiving body (1) having a receiving chamber (2) connected to a feed duct (3) and a conveying duct (4) extending substantially perpendicularly to the feed duct (3), and with at least one blocking device (5a) which is arranged in the aperture region of the fee duct (3) and reduces a cross section of the feed duct (3), characterized in that the blocking device (5):

(i) is movable to clear the cross section of the feed duct (3) to permit passage of a component in the direction of the receiving chamber (2) while blocking component passage in the opposite direction;

(ii) is spring-biased into the cross section of the feed duct; and (iii) has at least one blocking member (6,7) which penetrates into the cross section of the feed duct (3) and is inclined toward the receiving chamber (2).

4. Receptacle according to claim 3, characterized in that the blocking member (6, 7) extends through an orifice (8, 9) formed in the receiving body (1).

5. Receptacle according to claim 3, characterized in that the blocking member (6, 7) is mounted on the external surface (10) of the receiving body (1).

6. Receptacle according to claim 3, wherein the feed duct (3) has a substantially rectangular cross section, characterized in that the blocking member (6, 7) has a width substantially corresponding to a width of a wall (11) of the feed duct (3) adjacent to the blocking member (6, 7).

7. Receptacle according to claim 3, characterized in that at least the blocking members (6, 7) consist of a resilient material.

8. Receptacle according to claim 3, characterized in that the blocking device (5) has at least a pair of blocking members (6, 7), the blocking members (6, 7) of a pair being arranged opposite the feed duct (3).

9. Receptacle according to claim 8, characterized in that the blocking members (6, 7) of a pair are connected to one another by means of a connecting plate (12).

10. Receptacle according to claim 9, characterized in that the blocking members (6, 7) and the connecting plate (12) are formed in one part.

11. Receptacle according to claim 10, characterized in that the blocking members (6, 7) and the connecting plate (12) are formed in one piece.

12. Receptacle according to claim 11, characterized in that the connecting plate (12) rests on the external surface (10) of the receiving body (1).

13. Feed mechanism, in particular for a stud welding device, with a receptacle characterized by a receiving body (1) having a receiving chamber (2) connected to a feed duct (3) and a conveying duct (4) extending substantially perpendicularly to the feed duct (3), and with at least one blocking device (5a) which is arranged in the aperture region of the fee duct (3) and reduces a cross section of the feed duct (3), with the blocking device (5) being movable to clear the cross section of the feed duct (3) to permit passage of a component in the direction of the receiving chamber (2) while blocking component passage in the opposite direction.

14. Feed mechanism according to claim 13, characterized in that it comprises a loading pin (13) which can be introduced at least in part into the receiving chamber (2) and can be moved to and fro in the longitudinal direction of the conveying duct (4).

15. Feed mechanism according to claim 13, characterized in that the conveying duct (4) is formed at least in part by a tubular stud holder (14).

\* \* \* \* \*